United States Patent
Kim (10) Patent No.: US 10,870,363 B2
(45) Date of Patent: Dec. 22, 2020

(54) METHOD FOR CHARGING ELECTRIC VEHICLES

(71) Applicants: HYUNDAI MOTOR COMPANY, Seoul (KR); KIA MOTORS CORPORATION, Seoul (KR)

(72) Inventor: Seung Woo Kim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 132 days.

(21) Appl. No.: 16/204,951

(22) Filed: Nov. 29, 2018

(65) Prior Publication Data

US 2020/0070675 A1 Mar. 5, 2020

(30) Foreign Application Priority Data

Sep. 3, 2018 (KR) .................. 10-2018-0104499

(51) Int. Cl.
  *H02J 7/00* (2006.01)
  *B60L 53/30* (2019.01)
  *B60L 53/14* (2019.01)
(52) U.S. Cl.
  CPC .............. *B60L 53/30* (2019.02); *B60L 53/14* (2019.02); *B60Y 2200/91* (2013.01); *B60Y 2300/91* (2013.01)
(58) Field of Classification Search
  CPC .................................. B60L 53/30; B60L 53/14
  USPC ....................................................... 320/109
  See application file for complete search history.

(56) References Cited

U.S. PATENT DOCUMENTS

| 5,283,513 | A | 2/1994 | Fujita et al. |
| 10,322,636 | B2* | 6/2019 | Lee .................. B60L 53/16 |
| 2011/0156642 | A1 | 6/2011 | Noguchi et al. |
| 2012/0330489 | A1* | 12/2012 | Masuda ............. B60L 58/12 |
| | | | 701/22 |
| 2013/0088197 | A1 | 4/2013 | Kim et al. |
| 2014/0077731 | A1 | 3/2014 | Kuwano et al. |
| 2014/0184141 | A1* | 7/2014 | Loftus ............... B60L 53/65 |
| | | | 320/104 |
| 2015/0280188 | A1* | 10/2015 | Nozaki ............. H01M 2/1077 |
| | | | 429/156 |
| 2016/0107530 | A1* | 4/2016 | Roberts ............. B60L 53/16 |
| | | | 320/109 |

(Continued)

FOREIGN PATENT DOCUMENTS

| CN | 106160054 | 11/2016 |
| JP | 2012085467 | 4/2012 |

(Continued)

*Primary Examiner* — Suchin Parihar
(74) *Attorney, Agent, or Firm* — Lempia Summerfield Katz LLC (57) ABSTRACT

A method of charging electric vehicles includes charging a high-voltage battery unit with power supplied through two or more inlets. The method includes determining whether the charge amount of the high-voltage battery unit has reached a predetermined charge amount. The method includes charging the high-voltage battery unit with power supplied through one of the two or more inlets and controlling a first switching unit such that power supplied through the remaining inlets is provided to an application component when the charge amount of the high-voltage battery unit has reached the predetermined charge amount.

17 Claims, 6 Drawing Sheets

(56) References Cited

U.S. PATENT DOCUMENTS

| | | | |
|---|---|---|---|
| 2016/0153374 A1* | 6/2016 | Tashiro | F02D 29/02 |
| | | | 701/103 |
| 2016/0236578 A1* | 8/2016 | Liao | B60L 11/185 |
| 2017/0028861 A1 | 2/2017 | Spesser | |
| 2017/0253134 A1* | 9/2017 | Berger | B60L 11/1812 |
| 2020/0044464 A1* | 2/2020 | Sasu | B60L 53/67 |

FOREIGN PATENT DOCUMENTS

| | | |
|---|---|---|
| JP | 2014155420 | 8/2014 |
| KR | 101466435 | 11/2014 |
| KR | 1020150067491 | 6/2015 |

\* cited by examiner

METHOD FOR CHARGING ELECTRIC VEHICLES

This application claims priority to and the benefit of Korean Patent Application No. 10-2018-0104499, filed on Sep. 3, 2018, which is hereby incorporated by reference as if fully set forth herein.

BACKGROUND

Field of the Disclosure

The present disclosure relates to a method for charging electric vehicles.

Discussion of the Related Art

With increasing demand for electric vehicles, charging methods for improving charging efficiency are becoming increasingly important. High-voltage (HV) battery capacity currently applied to electric buses is about 256 kWh, which is larger than the battery capacity of normal electric cars. Accordingly, quick charging and charging using two inlets are applied in order to reduce the charging time of a large-capacity high-voltage battery. Quick charging power of electric buses is about 850V and 200 A when COMBO type 2 is used. Further, double deck electric buses require a high-voltage battery with battery capacity of 384 kWh and a charging method using three inlets.

As described above, a plurality of inlets is applied as a large-capacity high-voltage battery is used for commercial electric vehicles. Accordingly, a technique of using available power when a plurality of inlets is used in electric vehicles is required.

SUMMARY

The present disclosure provides a method for charging electric vehicles.

More specifically, the present disclosure provides a method for charging electric vehicles to alleviate a charging speed decrease according to the charge amount of a normal lithium-ion battery and to improve power supply effect using available power.

It will be appreciated by persons of ordinary skill in the art that the objects that could be achieved with the present disclosure are not limited to what has been particularly described hereinabove. The above and other objects that the present disclosure could achieve will be more clearly understood from the following detailed description.

To accomplish the aforementioned objects, a method for charging electric vehicles may include charging a high-voltage battery unit with power supplied through two or more inlets. The method may also include determining whether the charge amount of the high-voltage battery unit has reached a predetermined charge amount. The method may further include charging the high-voltage battery unit with power supplied through one of the two or more inlets and controlling a first switching unit such that power supplied through the remaining inlets is provided to an application component when the charge amount of the high-voltage battery unit has reached the predetermined charge amount.

According to an embodiment, the determining of whether the charge amount of the high-voltage battery unit has reached the predetermined charge amount may include determining whether the amount of current which can be supplied through the one inlet is equal to or greater than the remaining amount of current required for charging of the high-voltage battery unit based on the charge amount of the high-voltage battery unit.

According to an embodiment, the method may further include calculating charging characteristics such as charging current, a charging speed and a time required to complete charging according to the charge amount of the high-voltage battery unit and switching inlets used for charging from two or more inlets to one inlet based on a prestored lookup table.

According to an embodiment, the method may further include switching the inlet used for charging from one inlet to two or more inlets when the number of inlets used for charging is changed. Thus, charging efficiency of the high-voltage battery unit decreases.

According to an embodiment, the controlling of the first switching unit may include switching, by a switch connected to the remaining inlets, from a battery charging node to a high-voltage output terminal node based on a first switching control signal.

According to an embodiment, the method may further include controlling, by a first controller, the magnitude of a charging voltage and a current of an external charger. The method may further include receiving, by a second controller, information on required power from the application component. The method may also include calculating, by the second controller, required power based on the information on required power.

According to an embodiment, the method may further include receiving, by the second controller, user priority. The method may also include checking, by the second controller, an application component which requires effective power based on the user priority. The method may further include controlling, by the second controller, a second switching unit in a junction box in response to the checked application component.

According to an embodiment, the method may further include forming a direct path between an external charger and the application component according to the operation of the second switching unit.

According to an embodiment, the method may further include operating the second switching unit according to the priority to be sequentially connected to application components.

According to an embodiment, the method may further include storing, by a computer readable recording medium, a program for realizing the method of charging electric vehicles.

To accomplish the aforementioned objects, a vehicle may include two or more inlets connected to an external charger. The vehicle may further include a junction box configured to provide a charging voltage and a current supplied from the external charger through the inlets to a high-voltage battery unit and an application component. The vehicle may also include a first controller configured to control the magnitude of the charging voltage and the current of the external charger. The vehicle may further include a second controller configured to control the junction box, the application component, and the first controller. The second controller may determine whether the charge amount of the high-voltage battery unit has reached a predetermined charge amount when the high-voltage battery unit is charged with power supplied through the two or more inlets. When the charge amount of the high-voltage battery unit has reached the predetermined charge amount, the second controller charges the high-voltage battery unit with power supplied through one of the two or more inlets and controls a first switching unit such that power supplied through the remaining inlets is provided to the application component.

According to an embodiment, the second controller may determine whether the amount of current which can be supplied through the one inlet is equal to or greater than the remaining amount of current required for charging of the high-voltage battery unit based on the charge amount of the high-voltage battery unit.

According to an embodiment, the second controller may calculate charging characteristics such as charging current, a charging speed and a time required to complete charging according to the charge amount of the high-voltage battery unit and switching inlets used for charging from two or more inlets to one inlet based on a prestored lookup table.

According to an embodiment, the second controller may switch the inlets used for charging from one inlet to two or more inlets when the number of inlets used for charging is changed. Thus, charging efficiency of the high-voltage battery unit decreases.

According to an embodiment, the junction box may further include the first switching unit. A switch connected to the remaining inlets in the first switching unit may switch from a battery charging node to a high-voltage output terminal node based on a first switching control signal.

According to an embodiment, the second controller may receive information on required power from the application component and may calculate required power based on the information on required power.

According to an embodiment, the junction box may further include the second switching unit. Additionally, the second controller may receive user priority, check an application component, which requires effective power based on the user priority, and control the second switching unit in response to the checked application component.

According to an embodiment, the junction box may form a direct path between the external charger and the application component according to the operation of the second switching unit.

According to an embodiment, the second switching unit may operate according to the priority to be sequentially connected to application components.

The method of charging electric vehicles according to the present disclosure has the following effects.

First, after switching from charging using two inlets to charging using one inlet, an air-conditioner or a heater is operated using a 1-inlet charger, which stops charging, improving charging efficiency. In addition, user convenience application components such as a bedroom, heating/cooling cabinets, and a 220V inverter, can perform functions such as air-conditioning, charging, or other operations using power supplied from an external charger during charging of an electric vehicle, improving charging efficiency.

Second, smart operations such as preheating and preliminary cooling/air-conditioning during charging can be performed using external temperature sensing data. Additionally, preliminary operations of application components for improving customer convenience can be performed during charging by searching options set in a vehicle.

Third, when charging is performed while the inside of a bus is cooled, a time required to complete charging increases due to battery consumption caused by an air-conditioning operation (charging and air-conditioner on). However, the proposed algorithm can provide additional power without increasing a time required to complete charging.

It will be appreciated by persons of ordinary skill in the art that the effects that can be achieved with the present disclosure are not limited to what has been particularly described hereinabove. Other advantages of the present disclosure will be more clearly understood from the following detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

Hereinafter, a device and various methods to which embodiments of the present disclosure are applied are described in more detail with reference to the attached drawings. The terms "module" and "unit or part" used to signify components are used herein to aid in understanding of the components and thus they should not be considered as having specific meanings or roles.

In the following description of embodiments, it is to be understood that when an element is referred to as being "on" another element, it can be directly on the other element or intervening elements may be present therebetween. Furthermore, the expression "on" or "under" may be used herein to represent the relationship of one element to another element as illustrated in the figures.

It is to be understood that, although the terms first, second, A, B, (a), (b), etc. may be used herein to describe various elements of the present disclosure, these terms are only used to distinguish one element from another element and necessity, order, or sequence of corresponding elements are not limited by these terms. It is to be understood that when one element is referred to as being "connected to", "coupled to", or "accessing" another element, one element may be "connected to", "coupled to", or "access" another element via a further element although one element may be directly connected to or directly access another element.

Furthermore, the term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless obviously defined in the present disclosure, such terms are not interpreted as having ideal or excessively formal meanings.

Methods of charging electric vehicles according to the present disclosure can secure available power by switching one inlet for charging after battery charging using two or more inlets and use available power supplied through the remaining inlet for application components.

Figure 1:
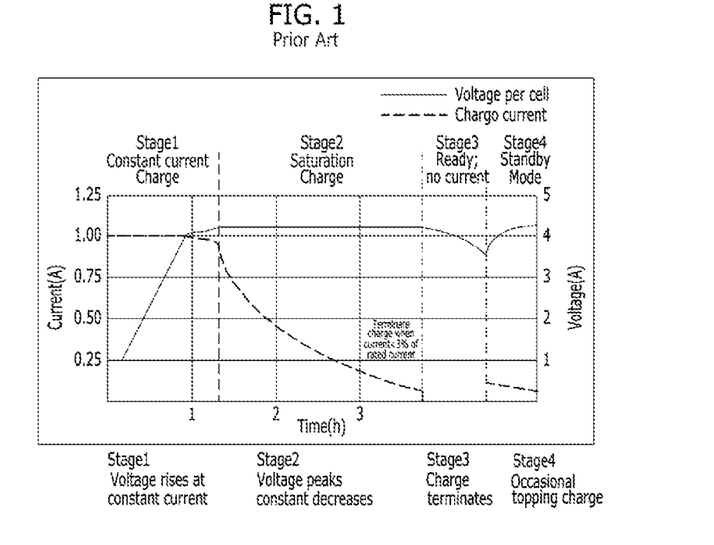
FIG. 1 shows a relationship between a battery charge amount and a charging speed in a conventional charging method.

FIG. 1 shows a relationship between a battery charge amount and a charging speed in a conventional charging method.

Referring to FIG. 1, in the conventional charging method, 2-inlet charging can start at battery voltage nodes. The battery charge amount increases as charging proceeds. Thereafter, charging current decreases as the battery charge amount increases. Thus, the charging speed is reduced.

Accordingly, battery capacity chargeable per hour decreases to less than 1-inlet charge amount per hour. Thus, 2-inlet charging may not be necessary. Accordingly, 2-inlet charging switches to 1-inlet charging when battery charge reaches a saturation state.

Figure 2:
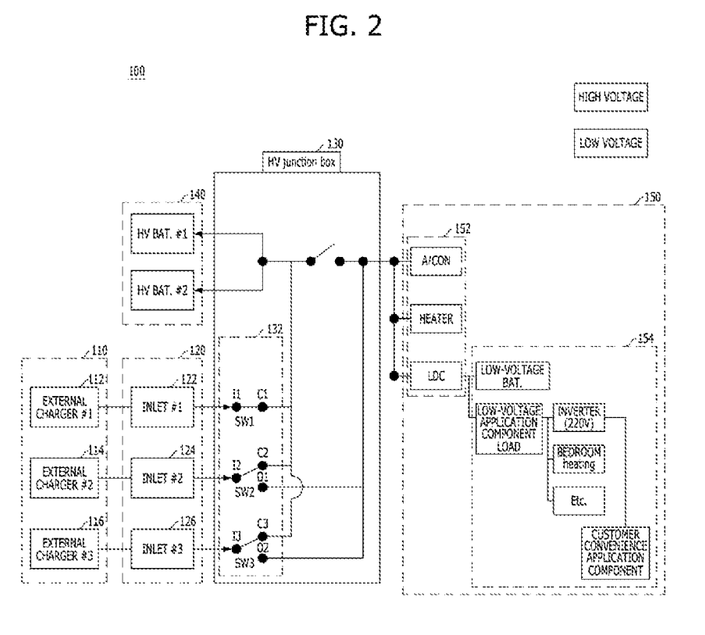
FIG. 2 illustrates a vehicle according to a first embodiment of the present disclosure.

FIG. 2 illustrates a vehicle according to a first embodiment of the present disclosure.

Referring to FIG. 2, two or more inlets may be used to charge a high-voltage battery unit according to the first embodiment.

A vehicle 100 may include an external charger 110, inlets 120, a high-voltage junction box 130, a high-voltage battery unit 140 and an application component 150. Hereinafter, the high-voltage junction box 130 is referred to as a "junction box 130".

The vehicle 100 may include a plurality of external chargers 110. The plurality of external charges 110 may be respectively connected to a plurality of inlets 120.

For example, a first external charger 112 may be connected to a first inlet 122. Then, the first external charger 112 can provide a charging voltage and current to the junction box 130 through the first inlet 122.

A second external charger 114 may be connected to a second inlet 124. Then, the second external charger 114 can provide a charging voltage and current to the junction box 130 through the second inlet 124.

A third external charger 116 may be connected to a third inlet 126. Then, the third external charger 116 can provide a charging voltage and current to the junction box 130 through the third inlet 126.

A plurality of inlets 120 may be provided. A charging voltage and current supplied through the plurality of charging inlets 120 may be transferred to the junction box 130.

The junction box 130 may provide the charging voltage and current supplied through the plurality of inlets 120 to the high-voltage battery unit 140 based on the operation of a first switching unit 132.

The first switching unit 132 may include a first switch SW1, a second switch SW2 and a third switch SW3. The first switch SW1 may connect a first input node I1 to a first battery charging node C1. The second switch SW2 may connect a second input node I2 to a second battery charging node C2. The third switch SW3 may connect a third input node I3 to a third battery charging node C3.

The high-voltage battery unit 140 can perform high-voltage battery charging using the charging voltage and current supplied from the first to third external chargers 112, 114 and 116 through the junction box 130.

For example, when the high-voltage battery unit 140 is charged through two or more inlets 120, the charging voltage and current supplied from the external chargers 110 may not be provided to the application component 150.

The application component 150 may include a high-voltage application component 152 and a low-voltage application component 154.

The high-voltage application component may include an air conditioner and a heater which are air-conditioning devices and a low DC-DC converter (LDC). The LDC may be connected to a low-voltage battery and the low-voltage application component 154. The low-voltage application component 154 may include an inverter, a bedroom heating device, and the like. The inverter may be connected to a user convenience application component.

Figure 3:
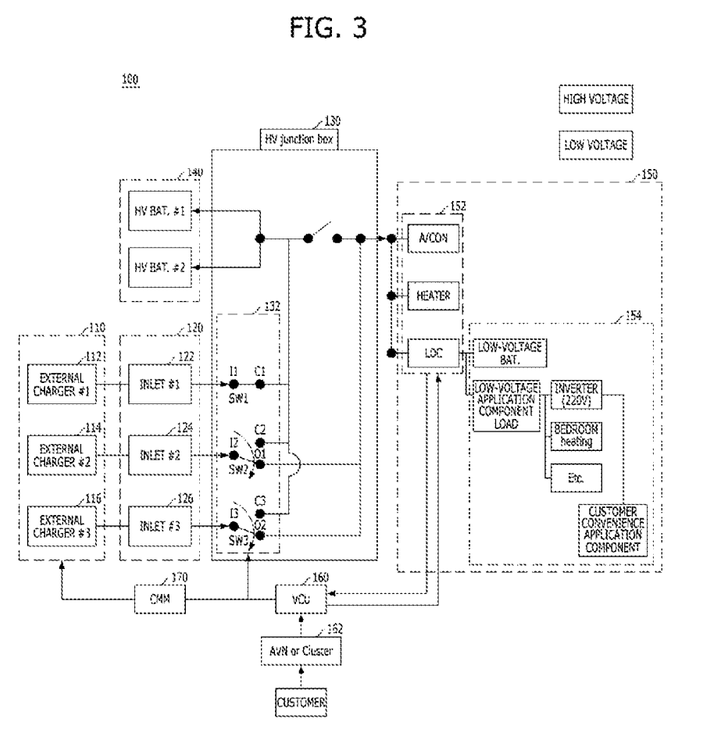
FIG. 3 illustrates a vehicle according to a second embodiment of the present disclosure.

FIG. 3 illustrates a vehicle 100 according to a second embodiment of the present disclosure.

The second embodiment illustrates a circuit where two or more inlets change to one inlet 120. In this embodiment, power supplied through the first inlet 122 may be used to charge the high-voltage battery unit 140. Power supplied through the second and third inlets may be used as available power.

Referring to FIG. 3, the vehicle 100 may include the external charger 110, the inlets 120, the junction box 130, the high-voltage battery unit 140, the application component 150, a vehicle control unit (VCU) 160, and a chassis management module (CMM) 170. The CMM 170 may be a first controller for a method of charging electric vehicles. The VCU may be a second controller for the method of charging electric vehicles.

The VCU 160 may receive the charge amount of the high-voltage battery unit 140. When the charge amount of the high-voltage battery unit 140 reaches a saturation level, the charging speed and the amount of current required for charging decrease. Accordingly, the VCU 160 can control power for charging the high-voltage battery unit 140 by adjusting the number of inlets 120 when the battery charge amount is equal to or greater than a predetermined value.

The VCU 160 may switch two or more inlets 120 to one inlet based on charging characteristics such as charging current, a charging speed and a time required to complete charging according to the charge amount of the high-voltage battery unit 140 and a prestored lookup table.

In addition, when charging efficiency is low during charging using one inlet, the VCU 160 can switch inlets 120 used for charging from one inlet to two or more inlets based on charging characteristics and the prestored lookup table.

For example, when the remaining amount of current which can be supplied using one inlet is equal to or greater than the remaining amount of current required for charging, high-voltage battery charging using power supplied through one inlet 120 is continued and high-voltage battery charging using power supplied through the remaining inlets may be stopped.

The VCU 160 may transmit a first switching control signal to the first switching unit 132 such that an input node is connected to a high-voltage output terminal node in the junction box 130.

The first switching control signal can control the second switch SW2 and the third switch SW3.

The second switch SW2 operates according to the first switching control signal to perform a switching operation such that the second input node I2 is connected to the second battery charging node C2 or a first high-voltage output terminal node O1. In addition, the third switch SW3 operates according to the first switching control signal to perform a switching operation such that the third input node I3 is connected to the third battery charging node C3 or a second high-voltage output terminal node O2.

The VCU 160 may control the operation of the application component 160. In this embodiment, the VCU 160 may receive customer preference utilization plans, customer preference application component priority, customer preference operation conditions, and the like through an input unit 162. The input unit 162 may include an audio video navigation (AVN) device and a cluster.

The VCU 160 can control the operation of the application component 150. To this end, the VCU 160 may receive information on required power from the application component 150. The VCU 160 may calculate power required for the application component 150 based on the information on the required power.

The CMM 170 may request control of power supplied by the external charger 110.

The CMM 170 may control the amounts of supplied voltage and current through PLC communication with the external charger 110. The CMM 170 may control the charging voltage and current of the external charger 110 based on information on required power received from the VCU 160.

For example, the CMM 170 can control the charging voltage and current of the second external charger 114 and the third external charger 116 according to required power of the application component 150.

The junction box 130 may include the first switching unit 132. The first switching unit 132 may include a first switch SW1, a second switch SW2 and a third switch SW3. The first switch SW1 may connect a first input node I1 to a first battery charging node C1. The second switch SW2 may connect a second input node I2 to a second battery charging node C2. The third switch SW3 may connect a third input node I3 to a third battery charging node C3.

The high-voltage battery unit 140 can charge high-voltage batteries using the charging voltage and current supplied from the first to third external chargers 112, 114 and 116 through the junction box 130.

The first switching unit 132 may operate in response to the first switching control signal of the VCU 160.

The second switch SW2 may switch from the second battery charging node C2 to the first high-voltage output terminal node O1 based on a control signal.

The third switch SW3 may switch from the third battery charging node C3 to the second high-voltage output terminal node O2 based on a control signal.

The junction box 130 may be connected to the high-voltage application component 152. The high-voltage application component 152 may be provided with the charging voltage and current through the first high-voltage output terminal node O1 and the second high-voltage output terminal node O2 of the junction box 130.

Figure 4:
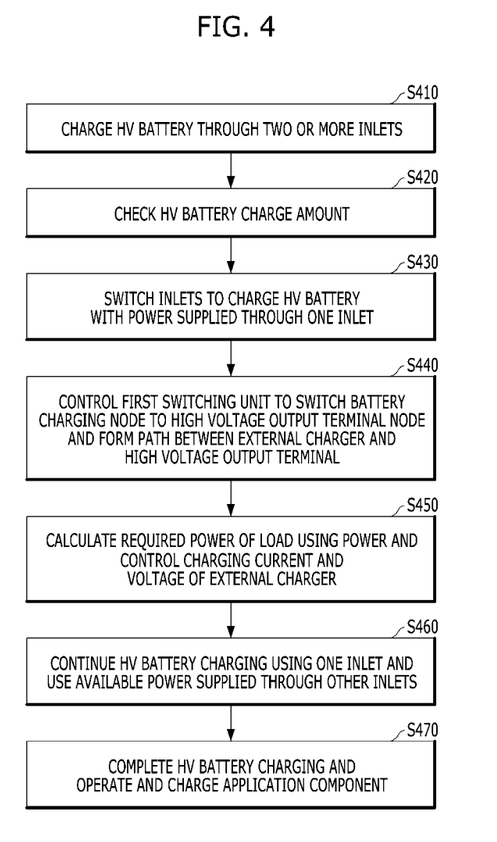
FIG. 4 is a flowchart illustrating a method of charging electric vehicles according to the second embodiment of the present disclosure.

FIG. 4 is a flowchart illustrating a method of charging electric vehicles according to the second embodiment illustrated in FIG. 3 of the present disclosure.

Referring to FIG. 4, an external charger 110 may charge the high-voltage battery unit 140 through two or more inlets (S410).

A VCU 160 may check whether the charge amount of the high-voltage battery unit 140 has reached a predetermined charge amount (S420).

When the charge amount of the high-voltage battery unit 140 has reached the predetermined charge amount, the VCU 160 may control the high-voltage battery unit 140 to be charged only using one inlet. Accordingly, the high-voltage battery unit 140 can be charged using power supplied through one inlet among the plurality of inlets 120 and power supplied through the remaining inlets 120 may be used as available power (S430).

Subsequently, the first switching unit 132 in the junction box 130 may operate. Switches of the first switching unit 132 which are connected to the remaining inlets 120 may switch to high-voltage output terminal nodes in a battery charging node. Accordingly, a path can be formed between the external charger 110 and a high-voltage output terminal (S440).

The VCU 160 may calculate required power of the application component 150. The VCU 160 may control the charging voltage and current of the external charger 110 through the CMM 170. The external charger 110 may supply a high voltage as the charging voltage and supply the charging current based on a calculated required power of a load which uses power (S450).

Accordingly, power supplied through one inlet among the inlets 120 may be continuously used to charge the high-voltage battery unit 140. In addition, power supplied through the remaining inlets 120 may be used as available power (S460). Accordingly, the available power can be used for the application component 150 while the high-voltage battery unit 140 is charged (S470).

The available power may be supplied to an application component corresponding to user priority through the remaining inlets 120.

Figure 5:
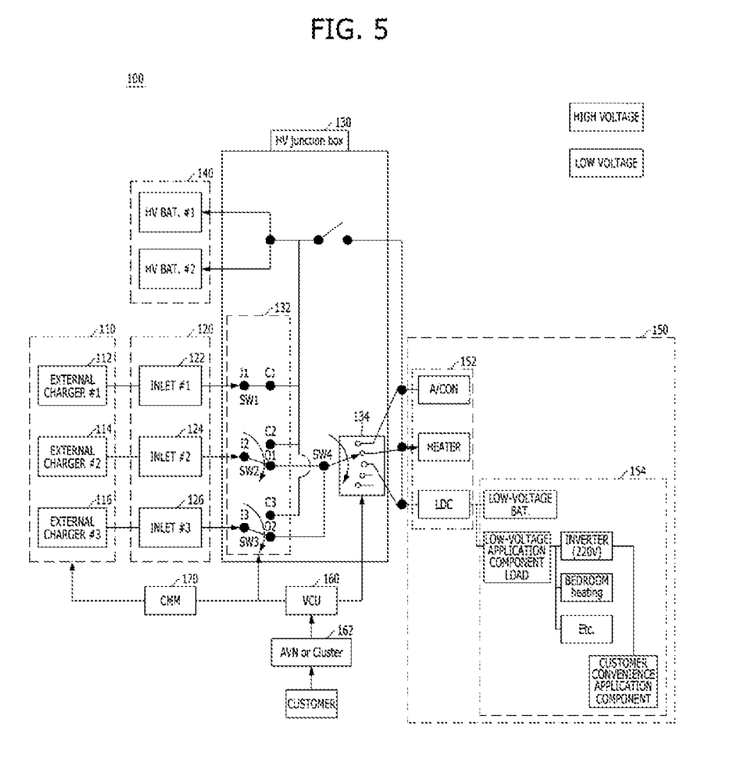
FIG. 5 illustrates a vehicle according to a third embodiment of the present disclosure.

FIG. 5 is a vehicle according to a third embodiment of the present disclosure.

Referring to FIG. 5, the third embodiment illustrates a circuit where two or more inlets 120 switch to one inlet 120. In this embodiment, the first inlet 122 may be used to charge the high-voltage battery unit 140. The second inlet 124 and the third inlet 126 may be used to operate an application component with priority using available power.

Referring to FIG. 5, the vehicle 100 may include the external charger 110, the inlets 120, the junction box 130, the high-voltage battery unit 140, the application component 150, the vehicle control unit (VCU) 160, and the chassis management module (CMM) 170.

The VCU 160 may switch two or more inlets 120 to one inlet based on charging characteristics such as charging current, charging speed and a time required to complete charging according to the charge amount of the high-voltage battery unit 140 and a prestored lookup table.

In addition, when charging efficiency is low during charging using one inlet, the VCU 160 can switch the inlet 120 used for charging from one inlet to two or more inlets based on charging characteristics and the prestored lookup table.

For example, when the amount of current which can be supplied using one inlet is equal to or greater than the amount of current required for charging, high-voltage battery charging using power supplied through one inlet 120 is continued. Additionally, high-voltage battery charging using power supplied through the remaining inlets may be stopped.

The VCU 160 may transmit a first switching control signal to the first switching unit 132 such that an input node is connected to a high-voltage output terminal mode in the junction box 130.

The first switching control signal can control the second switch SW2 and the third switch SW3.

The second switch SW2 operates according to the first switching control signal to perform a switching operation such that the second input node I2 is connected to the second battery charging node C2 or a first high-voltage output terminal node O1. In addition, the third switch SW3 operates according to the first switching control signal to perform a switching operation such that the third input node I3 is connected to the third battery charging node C3 or a second high-voltage output terminal node O2.

The VCU 160 may transmit a second switching control signal to a second switching unit 134 such that available power is sequentially supplied to application components with priority.

The second switching control signal may control a fourth switch SW4. The fourth switch SW4 operates according to the second switching control signal such that a direct path between the external charger 110 and an application component 150 with priority can be formed.

The VCU 160 may control the operation of the application component 150. In this embodiment, the VCU 160 may receive customer preference utilization plans, customer preference application component priority, customer preference operation conditions, and the like through an input unit 162. The input unit 162 may include an audio video navigation (AVN) device and a cluster.

The VCU 160 can control the operation of the application component 150. To this end, the VCU 160 may receive information on required power from the application component 150. The VCU 160 may calculate power required for the application component 150 based on the information on the required power.

The VCU may request that the CMM 170 control power supplied by the external charger 110 based on the information on required power.

The CMM 170 may control the amounts of supplied voltage and current through PLC communication with the external charger 110. The CMM 170 may control the charging voltage and current of the external charger 110 based on information on required power received from the VCU 160. For example, the CMM 170 can control the charging voltage and current of the second external charger 114 and the third external charger 116 according to required power of the application component 150.

The junction box 130 may include a first switching unit 132 and a second switching unit 134. The first switching unit 132 may include a first switch SW1, a second switch SW2 and a third switch SW3. The second switching unit 134 may include a fourth switch SW4.

The first switching unit 132 may operate in response to the first switching control signal of the VCU 160.

The second switch SW2 may switch from the second battery charging node C2 to the first high-voltage output terminal node O1 based on a control signal.

The third switch SW3 may switch from the third battery charging node C3 to the second high-voltage output terminal node O2 based on a control signal.

The second switching unit 134 may operate in response to the second switching control signal of the VCU 160.

The second switching unit 134 may perform a switching operation based on user priority received from the VCU 160 such that an application component with priority operates. In this embodiment, the second switching unit 134 may be sequentially connected to application components 150 according to priority order.

For example, when a first-priority application component 150 is a heater, the second switching unit 134 can control the fourth switch SW4 such that the charging voltage and current supplied through the first and second high-voltage output terminal nodes O1 and O2 are transferred to the heater only. Accordingly, a direct path between the external charger 110 and the heater can be formed.

Figure 6:
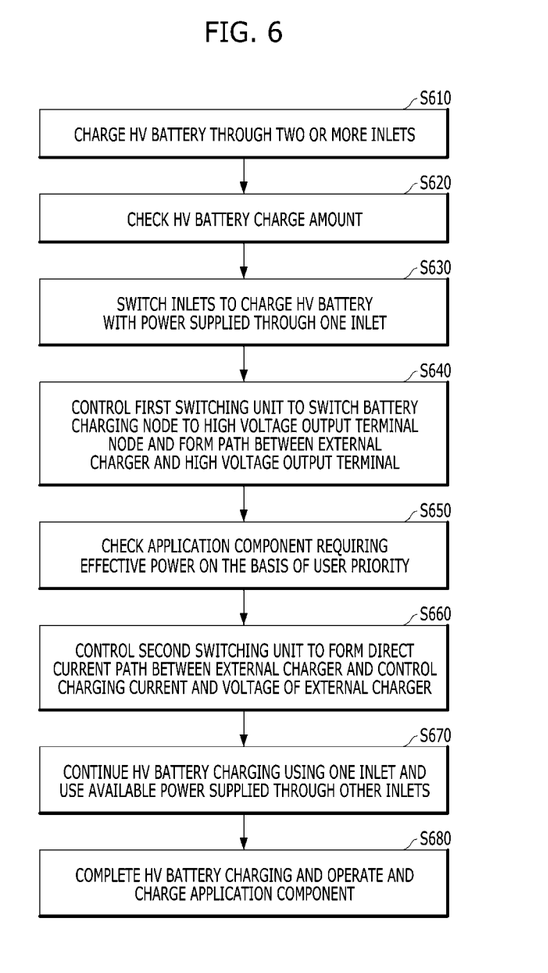
FIG. 6 is a flowchart illustrating a method of charging electric vehicles according to the third embodiment of the present disclosure.

FIG. 6 is a flowchart illustrating a method of charging electric vehicles according to the third embodiment illustrated in FIG. 5 of the present disclosure.

Referring to FIG. 6, the external charger 110 may charge the high-voltage battery unit 140 through two or more inlets in the vehicle 100 (S610).

The VCU 160 may check whether the charge amount of the high-voltage battery unit 140 has reached a predetermined charge amount (S620).

When the charge amount of the high-voltage battery unit 140 has reached the predetermined charge amount, the VCU 160 may control the high-voltage battery unit 140 to be charged using one inlet. Accordingly, the high-voltage battery unit 140 can be charged using power supplied through one of the plurality of inlets 120 and power supplied through the remaining inlets 120 may be used as available power (S630).

Subsequently, the first switching unit 132 in the junction box 130 may operate. Switches of the first switching unit 132 which are connected to the remaining inlet 120 may switch to high-voltage output terminal nodes in a battery charging node (S640).

The VCU 160 may check an application component 150 which requires effective power based on the user priority (S650). For example, if the temperature of the vehicle 100 does not satisfy a predetermined temperature condition, an air conditioner or a heater may be selected as a device with priority in order to satisfy the predetermined temperature condition.

The VCU 160 may control the second switching unit 134 of the junction box 130 to operate when a user priority device is selected. Accordingly, a direct path between the external charger 110 and a device to be provided with power can be formed. After a direct current path is formed in the junction box 130, the CMM 170 can control the charging current and voltage of the external charger 110 (S660).

Accordingly, charging of the high-voltage battery unit 140 may be continuously performed using one inlet among the inlets 120. While the high-voltage battery unit 140 is charged through the one inlet among the plurality of inlets 120, the remaining inlets 120 may be used to provide available power (S670).

Available power may be supplied to an application component corresponding to user priority through the remaining inlet 120 (S680).

The aforementioned methods according to various embodiments may be implemented as a program executed in a computer and stored in a computer-readable recording medium. Examples of the computer-readable recording medium include a ROM, a RAM, a CD-ROM, a magnetic tape, a floppy disk, an optical data storage device, etc. The computer-readable recording medium may be distributed to computer systems connected through a network, stored and executed as code readable in a distributed manner. Functional programs, code and code segments for implementing the aforementioned method may be easily deduced by programmers skilled in the art.

What is claimed is:

1. A method of charging electric vehicles, the method comprising:
   charging a high-voltage battery unit with power supplied through two or more inlets respectively connected to two or more external chargers;
   determining whether the charge amount of the high-voltage battery unit has reached a predetermined charge amount; and
   charging the high-voltage battery unit with power supplied through one of the two or more inlets and controlling a first switching unit such that power supplied through the remaining inlets is provided to an application component when the charge amount of the high-voltage battery unit has reached the predetermined charge amount, wherein the controlling of the first switching unit comprises switching, by a switch connected to the remaining inlets, from a battery charging node to a high-voltage output terminal node based on a first switching control signal.

2. The method according to claim 1, wherein the determining of whether the charge amount of the high-voltage battery unit has reached the predetermined charge amount comprises determining whether the amount of current which can be supplied through the one inlet is equal to or greater than the remaining amount of current required for charging of the high-voltage battery unit based on the charge amount of the high-voltage battery unit.

3. The method according to claim 1, further comprising calculating charging characteristics such as charging current, a charging speed and a time required to complete charging according to the charge amount of the high-voltage battery unit and switching inlets used for charging from two or more inlets to one inlet based on a prestored lookup table.

4. The method according to claim 3, further comprising switching the inlet used for charging from one inlet to two or more inlets when the number of inlets used for charging is changed and thus charging efficiency of the high-voltage battery unit decreases.

5. The method according to claim 1, further comprising:
controlling, by a first controller, the magnitude of a charging voltage and a current of an external charger;
receiving, by a second controller, information on required power from the application component; and
calculating, by the second controller, required power based on the information on required power.

6. The method according to claim 5, further comprising:
receiving, by the second controller, user priority;
checking, by the second controller, an application component which requires effective power based on the user priority; and
controlling, by the second controller, a second switching unit in a junction box in response to the checked application component.

7. The method according to claim 6, further comprising forming a direct path between an external charger and the application component according to the operation of the second switching unit.

8. The method according to claim 7, further comprising the second switching unit operating according to the priority to be sequentially connected to application components.

9. The method according to claim 1, further comprising storing, by a computer readable recording medium, a program for realizing the method of charging electric vehicles.

10. A vehicle comprising:
two or more inlets respectively connected to two or more external chargers;
a junction box configured to provide a charging voltage and current supplied through one of the two or more inlets to a high-voltage battery unit and provide a charging voltage and current supplied through the remaining inlets to an application component or to the high voltage battery unit;
a first controller configured to control the magnitudes of the charging voltage and current of the two or more external chargers; and
a second controller configured to control the junction box, the application component and the first controller,
wherein the second controller determines whether the charge amount of the high-voltage battery unit has reached a predetermined charge amount when the high-voltage battery unit is charged with power supplied through the two or more inlets and, when the charge amount of the high-voltage battery unit has reached the predetermined charge amount, charges the high-voltage battery unit with power supplied through one of the two or more inlets and controls a first switching unit such that power supplied through the remaining inlets is provided to the application component,
wherein the junction box further includes the first switching unit, and
wherein a switch connected to the remaining inlets in the first switching unit switches from a battery charging node to a high-voltage output terminal node based on a first switching control signal.

11. The vehicle according to claim 10, wherein the second controller determines whether the amount of current which can be supplied through the one inlet is equal to or greater than the remaining amount of current required for charging of the high-voltage battery unit based on the charge amount of the high-voltage battery unit.

12. The vehicle according to claim 10, wherein the second controller calculates charging characteristics such as a charging current, a charging speed and a time required to complete charging according to the charge amount of the high-voltage battery unit and switching inlets used for charging from two or more inlets to one inlet based on a prestored lookup table.

13. The vehicle according to claim 12, wherein the second controller switches the inlets used for charging from one inlet to two or more inlets when the number of inlets used for charging is changed and thus charging efficiency of the high-voltage battery unit decreases.

14. The vehicle according to claim 10, wherein the second controller receives information on required power from the application component and calculates required power based on the information on required power.

15. The vehicle according to claim 14, wherein the junction box further includes the second switching unit, and the second controller receives user priority, checks an application component which requires effective power based on the user priority and controls the second switching unit in response to the checked application component.

16. The vehicle according to claim 15, wherein the junction box forms a direct path between the external charger and the application component according to the operation of the second switching unit.

17. The vehicle according to claim 16, wherein the second switching unit operates according to the priority to be sequentially connected to application components.

* * * * *